(12) United States Patent
Dross

(10) Patent No.: US 11,067,247 B2
(45) Date of Patent: Jul. 20, 2021

(54) COLLIMATOR AND A LIGHTING UNIT

(71) Applicant: SIGNIFY HOLDING B.V., Eindhoven (NL)

(72) Inventor: Oliver Dross, Waalre (NL)

(73) Assignee: Signify Holding B.V., Eindhoven (NL)

( * ) Notice: Subject to any disclaimer, the term of this patent is extended or adjusted under 35 U.S.C. 154(b) by 0 days.

(21) Appl. No.: 16/488,264

(22) PCT Filed: Mar. 1, 2018

(86) PCT No.: PCT/EP2018/055012
§ 371 (c)(1),
(2) Date: Aug. 23, 2019

(87) PCT Pub. No.: WO2018/162310
PCT Pub. Date: Sep. 13, 2018

(65) Prior Publication Data
US 2020/0041098 A1 Feb. 6, 2020

(30) Foreign Application Priority Data
Mar. 7, 2017 (EP) ...................... 17159615

(51) Int. Cl.
*F21V 5/04* (2006.01)
*F21V 7/00* (2006.01)
*F21V 13/04* (2006.01)
*G02B 27/30* (2006.01)
*G02B 3/08* (2006.01)

(52) U.S. Cl.
CPC ............ *F21V 5/045* (2013.01); *F21V 7/0091* (2013.01); *F21V 13/04* (2013.01); *G02B 3/08* (2013.01); *G02B 27/30* (2013.01)

(58) Field of Classification Search
CPC ........ F21V 5/045; F21V 7/041; F21V 7/0091; F21V 5/04; G02B 3/08; G02B 19/00–0028
See application file for complete search history.

(56) References Cited

U.S. PATENT DOCUMENTS 6,414,314 B1 * 7/2002 Ikeda .................. G08B 13/193
250/336.1
9,335,569 B1 * 5/2016 Levine ..................... G02F 1/172
2009/0250095 A1 10/2009 Thorley et al.
(Continued)

FOREIGN PATENT DOCUMENTS

CN 1819287 A 8/2006
CN 1854597 A 11/2006
(Continued)

*Primary Examiner* — Mariceli Santiago
(74) *Attorney, Agent, or Firm* — Daniel J. Piotrowski

(57) ABSTRACT

The invention provides a collimator comprising a Fresnel lens comprising a refractive lens portion and a toothed total internal reflection portion. A light blocking element is at least between the lens portion and the light source. A portion of a light source output is blocked from reaching at least one region of the inner lens portion. At some or all parts of the lens portion, light does not reach those parts from the full area of the light source. This partial light blocking means the whole shape of the light source is not projected onto all of the lens portion, and the halo effect is reduced or eliminated.

13 Claims, 6 Drawing Sheets

(56) References Cited

U.S. PATENT DOCUMENTS

| | | | | |
|---|---|---|---|---|
| 2012/0055552 A1* | 3/2012 | Morgan | ................. | H01L 31/18 |
| | | | | 136/259 |
| 2013/0343061 A1 | 12/2013 | Liao et al. | | |
| 2015/0355534 A1 | 12/2015 | McCue | | |
| 2019/0196271 A1* | 6/2019 | Katsumata | ........ | G02F 1/133606 |

FOREIGN PATENT DOCUMENTS

| | | | | |
|---|---|---|---|---|
| CN | 107219573 A | * | 9/2017 | |
| CN | 108224110 A | * | 6/2018 | |
| EP | 1681509 A1 | | 7/2006 | |
| EP | 3112714 A1 | | 1/2017 | |
| EP | 3112741 A1 | | 1/2017 | |
| JP | H02116803 A | | 5/1990 | |
| JP | 2000030507 A | * | 1/2000 | .............. F21V 13/14 |
| JP | 2004265706 A | | 9/2004 | |
| JP | 2005309275 A | | 11/2005 | |
| JP | 2012503854 A | | 2/2012 | |
| JP | 2012174601 A | | 9/2012 | |
| JP | WO20160039130 A1 | | 3/2016 | |
| JP | WO2014038541 A1 | | 8/2016 | |
| JP | WO2018047975 A1 | | 6/2019 | |
| WO | 2016057580 A1 | | 4/2016 | |
| WO | 2016138552 A1 | | 9/2016 | |
| WO | 2016156339 A1 | | 10/2016 | |

\* cited by examiner

COLLIMATOR AND A LIGHTING UNIT

CROSS-REFERENCE TO PRIOR APPLICATIONS

This application is the U.S. National Phase application under 35 U.S.C. § 371 of International Application No. PCT/EP2018/055012, filed on Mar. 1, 2018, which claims the benefit of European Patent Application No. 17159615.8, filed on Mar. 7, 2017. These applications are hereby incorporated by reference herein.

FIELD OF THE INVENTION

This invention relates to lighting arrangements, and in particular lighting arrangements which make use of one or more collimators.

BACKGROUND OF THE INVENTION

Collimators, for example collimators used for light emitting diode (LED) applications, are used to provide a directed light output, for example a spot light beam. If several LEDs are required, a plurality of round collimators are typically provided and arranged in an array, known as a "shower head" array. The shape of the collimators means that the array includes unlit areas as a consequence of the lack of tessellation of the round collimators.

Thus, instead of several LEDs, a single light source (e.g. a chip on board (COB) LED) can be used with a single collimator. Single source spot lights are much preferred over multi-collimator solutions.

However, the optics for a single combined light source takes up a greater depth than an array of small collimators. In many LED devices, the depth required by a single light source is unavailable since other parts of the device, such as the heat sink and driver, take up a significant proportion of the available space.

For larger spot lamps with a single light source, Fresnel collimators are a good option, in particular total internal reflection (TIR) Fresnel lenses. Such lenses are efficient, compact and produce narrow beams.

FIG. 1 shows a typical Fresnel lens having a focal point 15. It comprises a center lens 10 which provides light focusing using two light refraction operations, and a surrounding annular toothed design which makes use of total internal reflection. In a typical design, 30% of the source light passes through the center lens and up to 70% of the light passes through the TIR Fresnel section. The lens is rotationally symmetric having an axis of rotational symmetry 13, and the light source 14 is located at the focal point 15 in a light source position 17 along the axis of rotational symmetry 13, which is the optical axis of the lens. The light source 14 is not a point source but has an area which is significant compared to the size of the center lens. The light source 14 provides light around the optical axis direction. The full area of the light source (which can be considered to occupy a light source region, centered at the light source position) emits light to each point of the center lens.

The achievable on-axis intensity from a TIR lens is dominated by the TIR path which contributes approximately 70%. The intensity is proportional to the source luminance times the area emitting along the axis. The lens covers only a small surface part of the collimator and therefore has little surface area and hence contributes little to the intensity.

There are other substantial differences between the light paths between the center lens section and the TIR section. The TIR path is a non-imaging path and it produces a relatively narrow light distribution, due to the rules of etendue and the ray assignation in a TIR Fresnel lens. To provide the narrowest light distribution, the center lens will be an approximately imaging lens with one or two convex surfaces. However, from the etendue it can be shown that such light distribution is much wider than the light distribution of the TIR Fresnel section (commonly 2 to 3 times wider). Such light is in many cases unwanted, because it creates a halo around the main beam, which often has a sharp, very visible edge. User tests show that a halo around the main beam is perceived as relating to lower quality.

The center lens, especially because of its imaging characteristics, is problematic when used with COB sources, because the edge of such sources emits fully converted yellowish light. The center lens puts such light at the edge of the light distribution, thus creating a yellow outermost ring around the light distribution, which is not desired.

The problem of the large center lens images is linked to the geometrical constraints of typical TIR Fresnel collimators. In other words, there is too high etendue in the center lens section. Making the beam angle smaller while maintaining the size of the lens is only possible by reducing the etendue, which means reducing the amount of flux transmitted through the lens. This can be done by using a blocking feature to absorb or reflect part of the light.

A blocking device for example may take the form of a louver element on top of the collimator, either covering the full exit aperture or only the center lens. Such element, if the absorbing louvers are thin, lets all light parallel to the optical axis through while blocking light emitted at an off-axis angle. The transmission profile is basically triangular.

To make such a louver device efficient, it needs to be of very thin material, e.g. metal, which makes it expensive. It thus adds volume and cost to the design.

There is therefore a need for a collimator design which addresses the problem that the center lens of as TIR Fresnel collimator produces much wider light distributions than the TIR Fresnel section, thus creating a halo, glare and possible color fringes.

SUMMARY OF THE INVENTION

The invention is defined by the claims.

According to examples in accordance with a first aspect of the invention, there is provided a collimator, having a focal point, for positioning over a light source to be provided at the focal point in a light source position, the collimator comprising:

a Fresnel lens comprising a refractive inner lens portion and an outer toothed total internal reflection portion, the Fresnel lens having an optical axis which passes through the center of the inner lens portion and through the light source position; and a light blocking element between at least the inner lens portion of the Fresnel lens and the light source position, wherein the light blocking element is adapted such that the inner lens portion has at least one reduced image region, said reduced image region being an area of the inner lens portion where only a portion of the whole shape of the light source can be projected onto when the light source is positioned in the light source position.

This collimator design provides blocking of light to the central lens of a Fresnel structure. In particular, at some or all parts of the inner lens portion, light does not reach those parts from the full area of the light source. This partial light blocking can be used to reduce the beam angle reaching the inner lens portion (by blocking light at larger angles) but it is also possible to block light from the center and allow more to reach larger angles. In all cases, by having areas where the whole shape of the light source is not projected onto the inner lens portion or in other words, the inner lens portion has areas where only a portion of the whole shape of the light source is projected onto, the halo effect described above can be reduced or eliminated, if desired.

The blocking element makes the light distribution of the center lens narrower, less sharp and helps to eliminate color artifacts from the source. While the efficiency of the spot is inevitably reduced, the peak intensity can be maintained.

The light blocking may comprise absorption and/or reflection. It may affect only the central lens portion and then has no or minimal light blocking effect on the TIR section of the Fresnel lens. Alternatively, light can be blocked from passing through the first part of the TIR section as well. The first TIR teeth also result in some low intensity halo, although less intense and of smaller angles than the center lens.

The "reduced-image region" may be defined as a part of the surface of the inner lens portion (i.e. the central refractive lens) where the light only reaches that part from a fraction of the area of the light source. Generally, it is desirable to block an edge region of the light source from projecting light to that "reduced-image region" part of the lens surface. There may however also be part of surface of the inner lens portion where the full light source area is visible (i.e. projected onto the surface).

In one example, the reduced-image region may comprise at least a portion of the inner lens portion at the optical axis. Thus, the central part of the inner lens portion may receive a reduced light output from the light source.

The light blocking element for example comprises a conical baffle. This provides a light narrowing function, which limits the angular spread of light reaching the central part, and optionally also the radial outer part of the lens. This may be achieved by having an opening to the conical baffle which is smaller than the light source (or smaller than the beam envelope from the light source to the outer edge of the inner lens portion).

The conical baffle for example has a first opening adjacent the light source position, and a second, larger, opening adjacent the inner lens portion, wherein the second opening is smaller than the inner lens portion. Thus, there is light reaching the inner lens portion from inside the conical baffle as well as around the outside of the conical baffle.

In another example, the light blocking element comprises a light blocking baffle centered on the optical axis. This may simply block rather than funnel light so that light has to pass around the outer edge of the baffle.

The light blocking baffle is for example adapted to extend within an area defined by paths between an edge of the light source region, corresponding to the size of the light source at the light source position, and a point on the opposite edge of the inner lens portion. The position of this point is a design choice, which controls how much blocking is implemented.

This means no light reaches the center of the inner lens portion.

The light blocking baffle may be a reflector to reflect light back to the light source location. This provides recycling of the blocked light.

In another set of examples, the reduced-image region comprises at least an outer periphery of the inner lens portion. Thus, the light to the central part or the outer part (or both) of the inner lens portion may be reduced.

The light blocking element may again comprise a conical baffle. However, the conical baffle may then have a first opening adjacent the light source position, and a second, larger, opening adjacent the inner lens portion, wherein the second opening corresponds in size to the inner lens portion.

In another set of examples, the reduced-image region comprises the entire inner lens portion. For example, the light blocking element may comprise a set of concentric conical baffles arranged against the entire surface of the inner lens portion. They form an array of small light blocking elements distributed across the area of the inner lens portion.

In another set of examples, the light blocking element may comprise a set of radially extending fins disposed in an annular arrangement. These fins block skew rays, which may be incident on the inner lens portion because the light source has a finite light output area (i.e. it is not a point source). Thus, the light blocking element reduces skewness.

The different examples may be combined. For example, the radial fins may be combined with any of the other designs. The light blocking flat or reflecting baffles may also be combined with conical baffles.

Depending on the design of the light blocking element, such as the baffles, the inner lens portion (the center lens) may need to be redesigned to take into account the characteristics of the light after the light blocking element baffle and then to realize the beam narrowing.

The invention also provides a lighting unit comprising:
a collimator arrangement as defined above; and
a light source positioned at the light source position.

The light source is for example adapted to provide a light output from a light source region centered on the optical axis at the light source position. Thus, the light source position may be considered to be a single point in space along the optical axis, and the light source region may be considered to be a region in space corresponding to the size of the light emitting exit surface of the light source.

BRIEF DESCRIPTION OF THE DRAWINGS

Examples of the invention will now be described in detail with reference to the schematic accompanying drawings in which some parts may be shown in exaggerated form for the sake of clarity, and in which.

DETAILED DESCRIPTION OF THE EMBODIMENTS

The invention provides a collimator comprising a Fresnel lens having a focal point and comprising a refractive lens portion and a toothed total internal reflection portion. A light blocking element is at least between the lens portion and the light source provided in a light source position. A portion of a light source output is blocked from reaching at least one region of the inner lens portion. At some or all parts of the lens portion, light does not reach those parts from the full area of the light source. This partial light blocking means the whole shape of the light source is not projected onto all of the lens portion, and the halo effect is reduced or eliminated. This serves to reduce the etendue of the light source and reduces the beam angle of the center lens, its imaging characteristics, the yellow ring problem and glare issues.

The light blocking element can be reflective to recycle part of the light by sending light back to the source or it can be absorbing.

Figure 1:
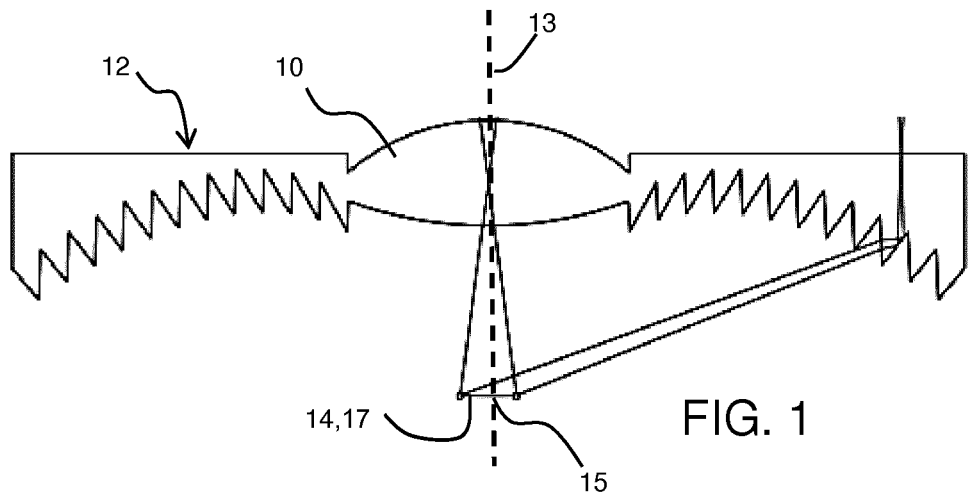
FIG. 1 shows a typical Fresnel lens.
Figure 2:
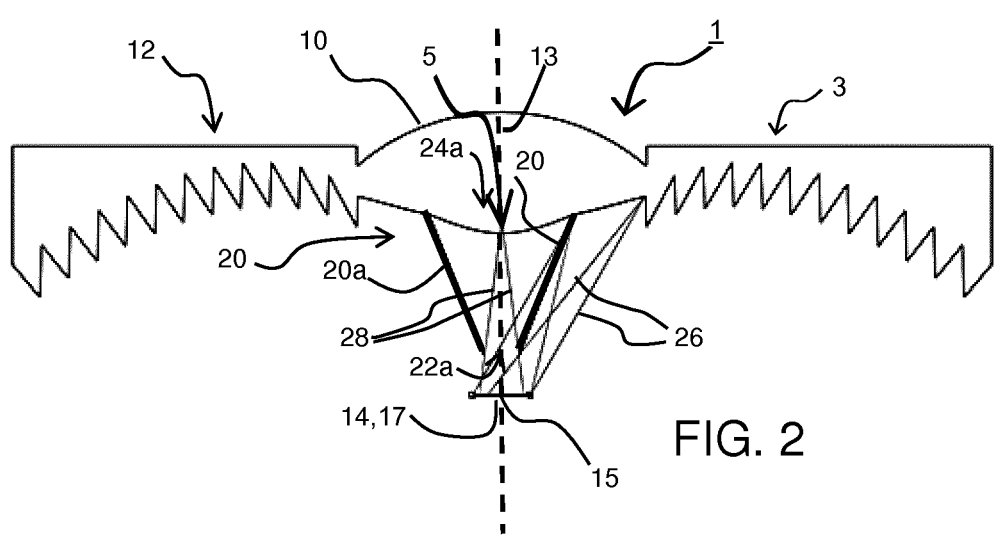
FIG. 2 shows a first example of a Fresnel lens having a blocking element between the center lens and the light source position.

FIG. 2 shows a first example of a collimator 1, in which the light blocking element generally designated as 20 is in the form of a central conical baffle 20a. It is positioned between the center lens 10 (which is an "inner lens portion") of the Fresnel lens 3 and the light source position 17. An optical axis 13 passes through the center 5 of the Fresnel lens, through the focal point 15 and through the light source 14 positioned at the focal point.

The conical baffle has a first opening 22a adjacent the light source, and a second, larger, opening 24a adjacent the center lens. The second opening 24a is smaller than the center lens so that the second opening divides the center lens into a circular inner part and an annular outer part.

The light blocking element means that light from the full area of the light source 14 does not reach every point of the center lens. Instead, a portion of a light source output from the light source is blocked from reaching at least one part of the center lens, which will be called a "reduced-image region" in that only part of the light source output is projected onto that region hence giving a reduced image.

In FIG. 2, the range of light angles reaching a radially outer point of the center lens is defined by light paths 26 (light from the left part of the light source 14 does not reach the center lens at that point). The range of light angles reaching a central point of the center lens is defined by light paths 28 (light from the left and right sides of the light source 14 does not reach the center lens at that point).

Thus, in FIG. 2, the "reduced-image region" is the entire center lens, so that no point on the entry surface of the center lens "sees" the full source but all points see an extended partial section of the light source. By choosing the fraction of the light source which is visible to the entry surface of the center lens, the edge rays as shown in FIG. 2 can be defined, and the intersections define the start and end points of the conical baffle, as can also be seen in FIG. 2.

In this design, large portions of the center lens see little or none of the light source edge, which leads to a reduction of the yellow ring problem.

The center lens may retain the same outer concave lens surface design as before introducing the conical baffle. Alternatively, numerical optimization of the two sections (circular inner and annular outer) of the entry lens may be performed. Another approach is to use non-imaging optics design rules to redesign the center lens to optimally collimate light from the baffled light source. The edge rays of the lens/cone combination may be used in the design to ensure that all images are centered around the optical axis.

Figure 3:
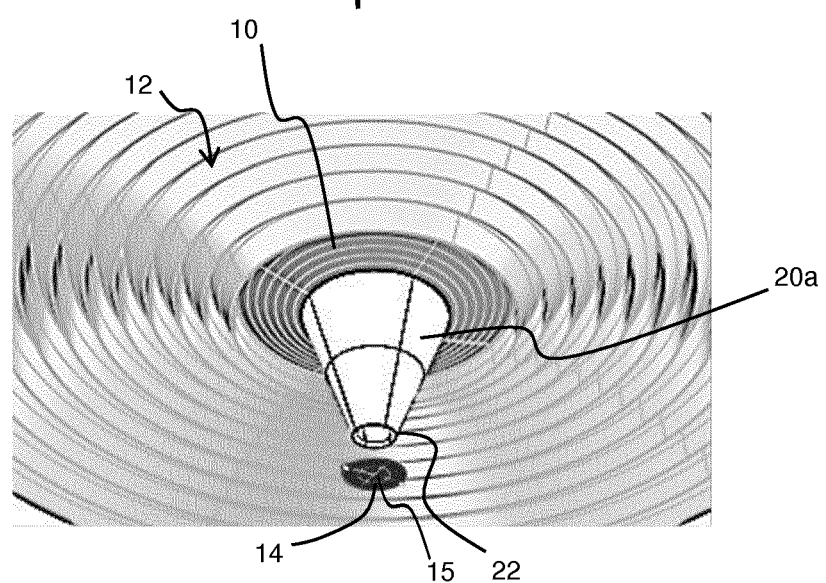
FIG. 3 shows a perspective view of the design of FIG. 2 from beneath the lens.

FIG. 3 shows a perspective view of the design of FIG. 2 from beneath the lens.

Figure 4:
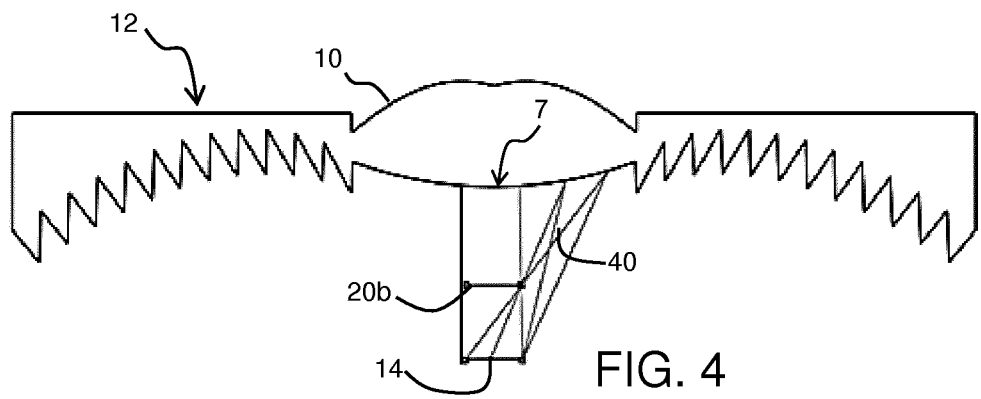
FIG. 4 shows a second example.

FIG. 4 shows an example in which the light blocking element 20 comprises a flat baffle 20b placed between the light source 14 and the center lens 10. The baffle is centered on the optical axis. In the reduced-image region 7 only part of the light source output is projected onto that region hence giving a reduced image.

The baffle 20b extends within an area defined by paths between an edge of the light source region, corresponding to the size of the light source at the light source position, and an opposite edge of the center lens. One such ray is shown as 40. It means that for all of the area of center lens inside that edge receives light from only one edge of the light source.

In this case, the entry surface of the center 10 is unaltered. However, the exit surface of the center lens 10 is replaced with a dedicated design using the wavefront from the edges of the source and baffle to obtain optimal collimation.

In general the absorbing baffle does not have to be flat, it can be of any shape, preferably with rotational symmetry, such as a sphere, or any aspheric shape. This can in some cases improve the ray blocking.

Figure 5:
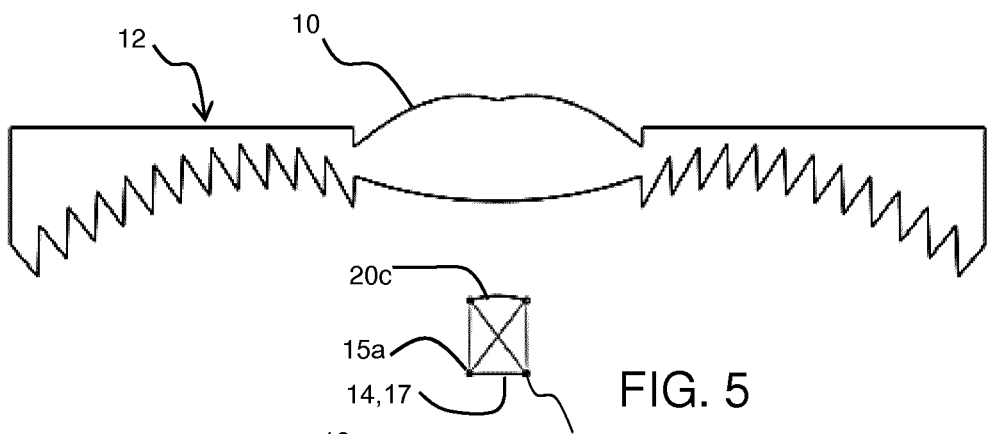
FIG. 5 shows a modification to the design of FIG. 4.

FIG. 5 shows a modification to the baffle of FIG. 4, in which it comprises a reflecting elliptical element 20c. The two foci 15a, 15b of the ellipse are the edges of the light source 14, which is positioned in the light source position 17. This ensures all light hitting the baffle is reflected back to the light source for recycling.

In FIGS. 4 and 5, the "reduced-image region" is the central part of the center lens, up to the edge.

Figure 6:
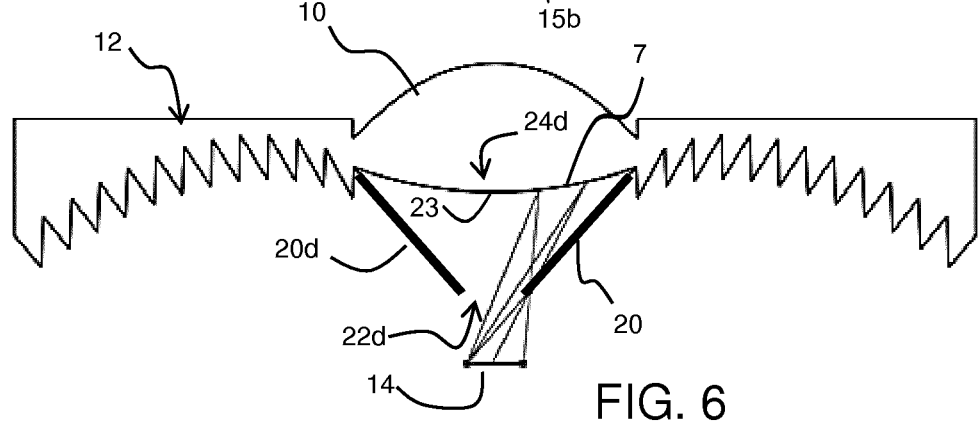
FIG. 6 shows a third example.

FIG. 6 shows an example in which the light blocking element 20 comprises a different design of conical baffle 20d. The conical baffle 20d again has a first opening 22d adjacent the light source position, and a second, larger, opening 24d adjacent the inner lens portion. In this design, the second opening corresponds in size to the center lens. The baffle is in particular located on the line connecting the edge of the source with the opposite edge of the center lens entry surface.

The endpoint of the cone (at the first opening 22d) determines how much of the center lens "sees" a reduced section of the source, i.e. the amount of blocking. Here the exit lens is redesigned. In particular, as the rays are very inclined at the edge of the center lens, the exit lens bulges out more than in other designs.

In this design, the reduced-image region 7 comprises at least an outer periphery of the center lens 10. The middle 23 of the center lens may see the full light source.

Figure 7:
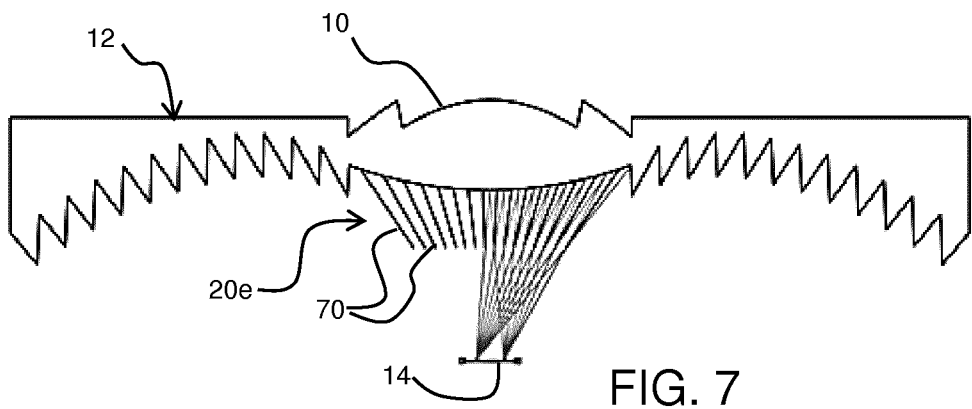
FIG. 7 shows a fourth example.

FIG. 7 shows a design in which the reduced-image region comprises the entire center lens by providing the light blocking element 20 as a set 20e of conical baffles 70 arranged against the entire surface of the center lens. These conical baffles form nested cones, i.e. they all share a common central axis and are arrange concentrically. This design limits light hitting the center lens to a smaller angular extent at each point on the center lens. The design of the center lens can be the same as without the light blocking element. This design will introduce additional light losses, which is in part dependent on the thickness of the baffle walls.

The examples above are designed only in the meridional (optical) plane. They are not specifically designed to block light in the sagittal (out of plane) rays.

In some of the examples, the blocking in the sagittal direction is much less effective than in the meridional plane, so that some skew rays are emitted at angles similar to the extreme rays of the unblocked center lens.

Figure 8:
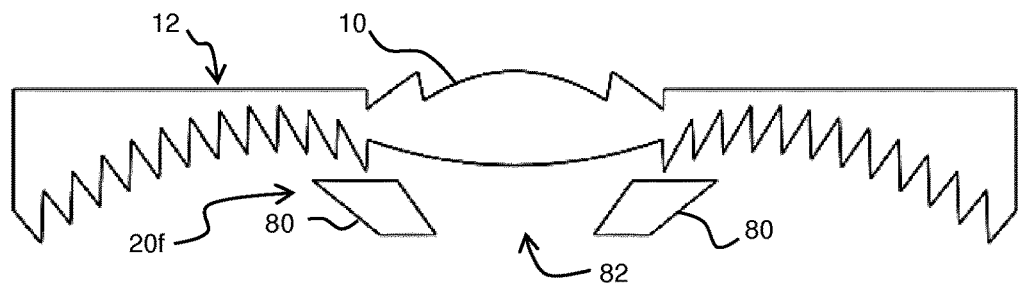
FIG. 8 shows a fifth example in which the light blocking element for blocking skew rays.

Such rays can be specifically blocked by a baffle acting in the sagittal direction as shown in FIG. 8.

In FIG. 8, the light blocking element 20 comprises a set 20f of radially extending fins 80 disposed in an annular arrangement and defining a central opening 82. This may be described as a star baffle.

The radial star baffle is able to block skew rays effectively. The geometric conditions for such baffles follow from the skewness of the source edge rays and the intended emission angle. The more baffles that are placed in a circular array around the optical axis and the longer they extend along the source ray direction, the smaller the maximum skew transmission angle.

In the examples of FIGS. 2 to 7, the light blocking element is only used to alter the light reaching the center lens. FIG. 8 shows that the baffles 80 may be used to limit the skew rays at the edge of the center lens and also at the first section of TIR teeth. These teeth of the TIR Fresnel lens emit light to large angles in the sagittal direction.

Figure 9:
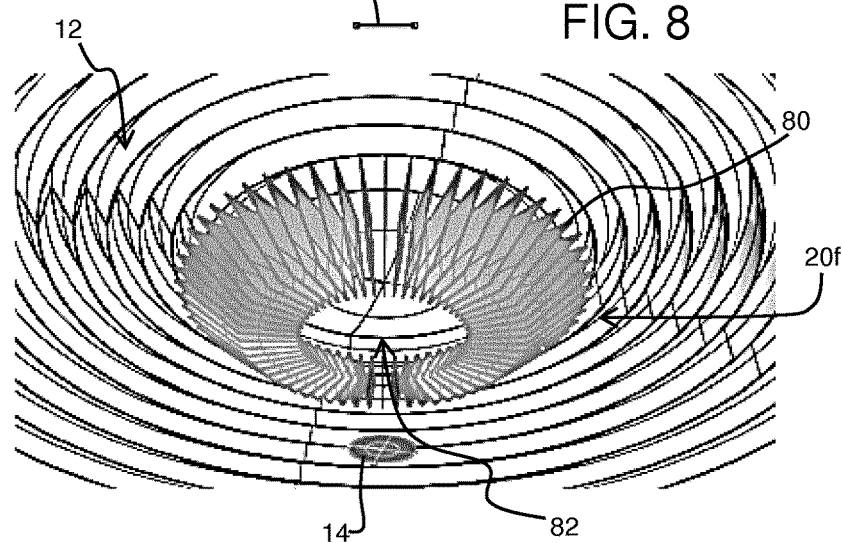
FIG. 9 shows a perspective view of the radial baffle arrangement of FIG. 8 from underneath the lens.

FIG. 9 shows a perspective view of the radial baffle arrangement 20f of FIG. 8 from underneath the lens.

Different designs can be combined. For example, the radial fin design (star baffle) 20f may be combined with any of the other designs of light blocking element (flat baffle of FIG. 4, reflecting baffle of FIG. 5, small conical baffle of FIG. 2, large conical baffle of FIG. 6 and nested conical baffles of FIG. 7). Furthermore, different baffle designs (other than the radial fin design) may be combined, such as the large conical baffle of FIG. 6 and the center baffles of FIG. 4 or 5.

Figure 10:
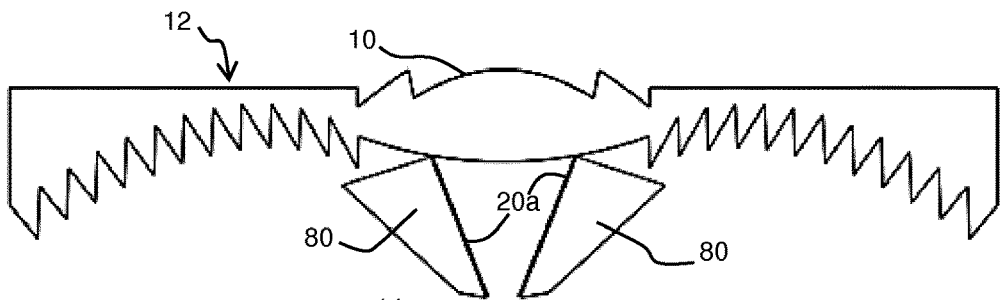
FIG. 10 shows a design in which the design of FIG. 2 is combined with the design of FIG. 8.
Figure 11:
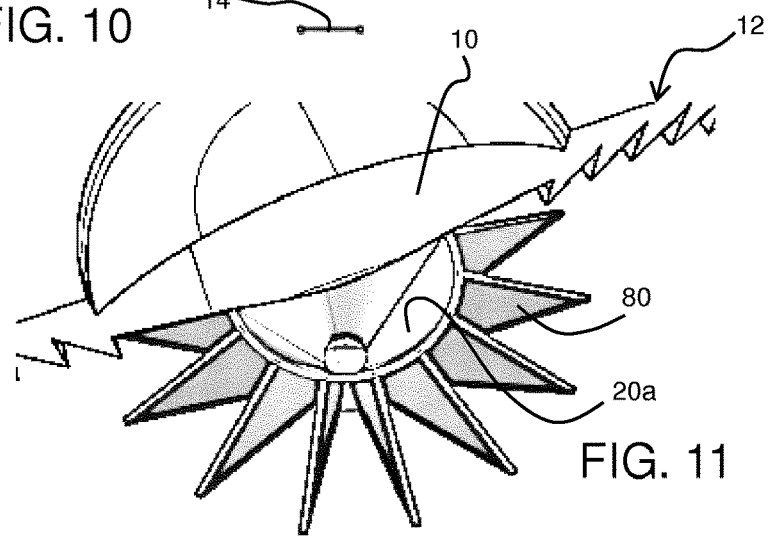
FIG. 11 shows a perspective view of the design of FIG. 10 from above the lens.

FIG. 10 shows a design in which the small conical baffle 20a of FIG. 2 is combined with the radial fins 80 of FIG. 8. FIG. 11 shows a perspective view from above the lens, with the Fresnel lens cut away to reveal the cone baffle and radial fins beneath.

The optical performance of the design has been verified using ray tracing software.

Figure 12:
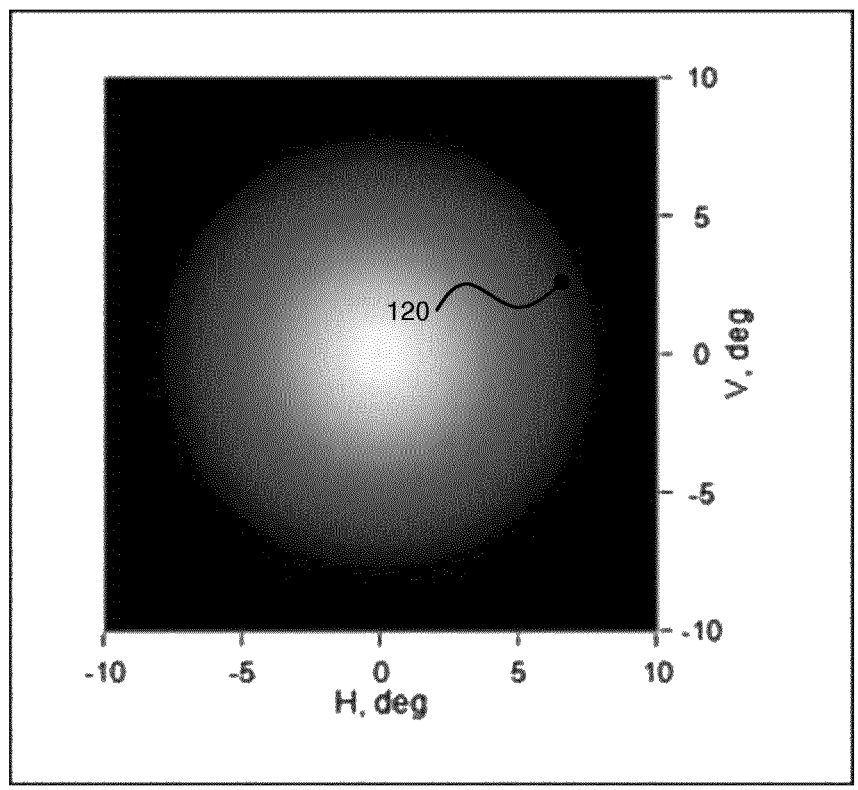
FIG. 12 shows the far field light intensity for a non-modified lens for the full Fresnel lens.

FIG. 12 shows the far field light intensity for a non-modified lens based on a simplified COB LED arrangement with a yellow ring 120 at the edge (the yellow color of course is not visible in FIG. 12). It shows the light intensity for the full Fresnel lens.

Figure 13:
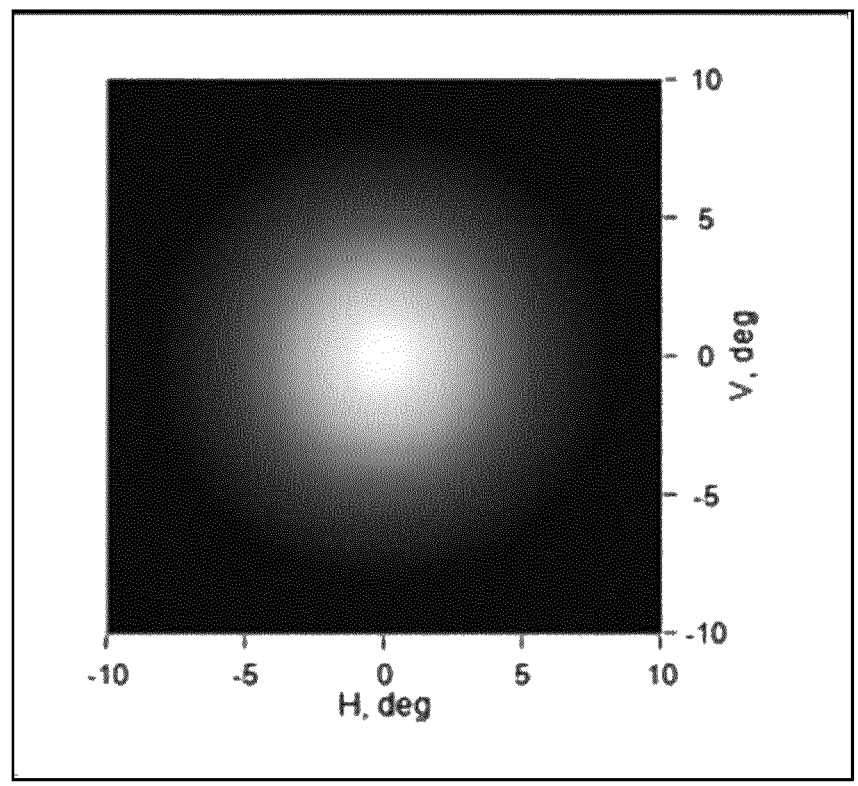
FIG. 13 shows the effect on the far field light intensity of FIG. 12 using the design of FIG. 2.

FIG. 13 shows the effect on the far field light intensity using the design of FIG. 2. The yellow ring becomes invisible and the halo is smoothed out.

Figure 14:
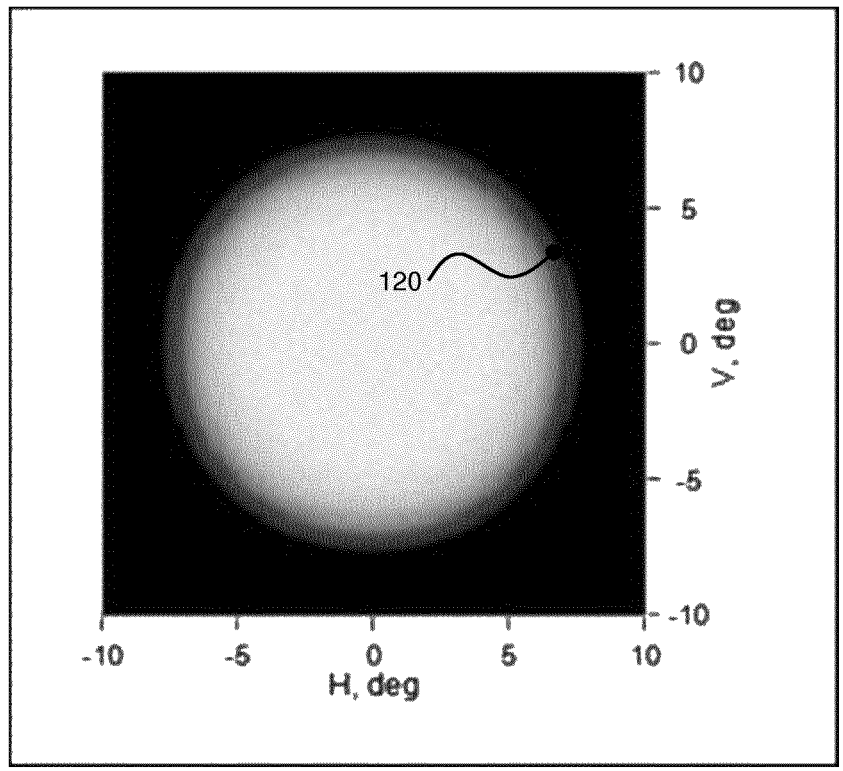
FIG. 14 also shows the far field light intensity for a non-modified lens only for the center lens.

FIG. 14 also shows the far field light intensity for a non-modified lens based on a simplified COB LED arrangement with a yellow ring 120 at the edge (again the yellow color of course is not visible in FIG. 14). This image shows the light intensity only for the center lens.

Figure 15:
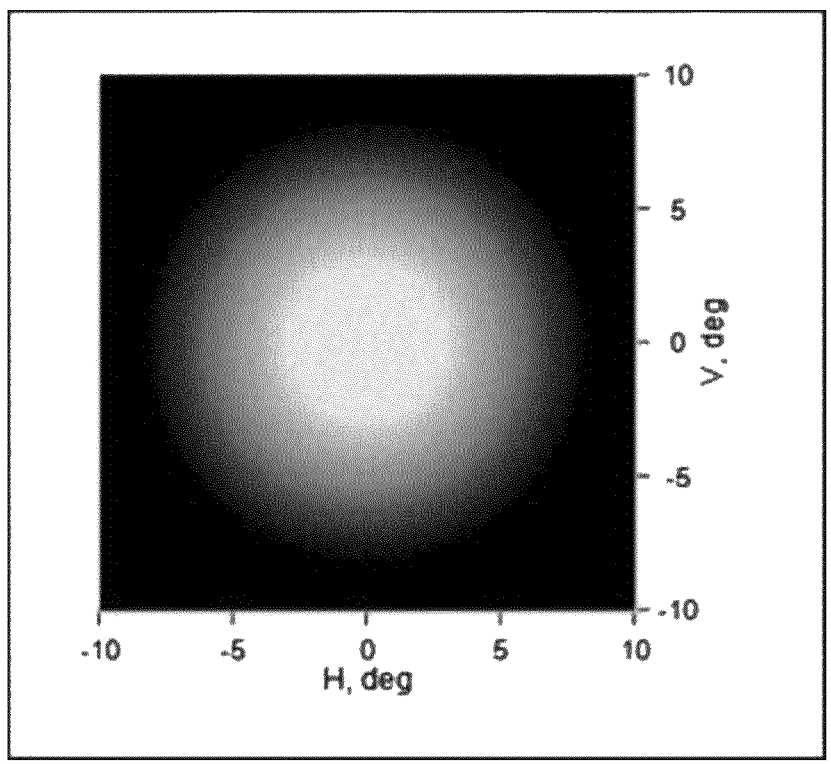
FIG. 15 shows the effect on the far field light intensity of FIG. 14 using the design of FIG. 2.

FIG. 15 shows the effect on the far field light intensity for the center lens only again using the design of FIG. 2.

In this example the beam angle and intensity is maintained at the same level but the field angle is reduced from about 11.5 degrees to 9.5 degrees. The efficiency was reduced by 16%.

Figure 16:
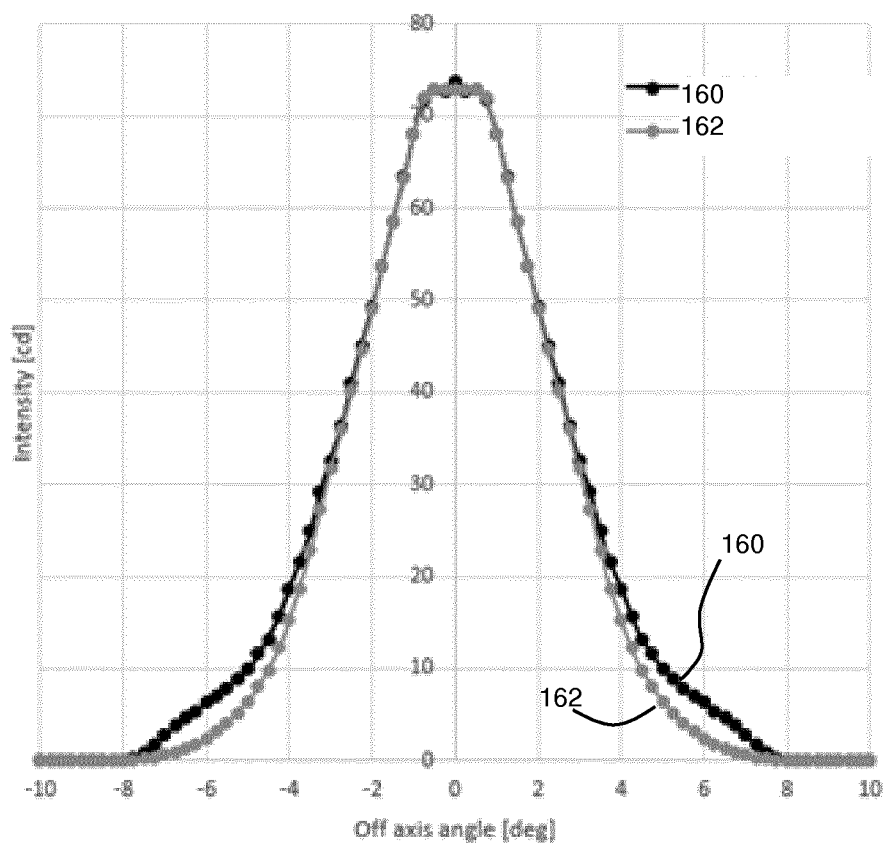
FIG. 16 shows the light intensity as a function of angle for the design of FIG. 2 compared to a design without the light blocking element.

FIG. 16 shows the light intensity as a function of angle. Plot 160 is for a standard Fresnel lens, and plot 162 shows the change by introducing the baffle design of FIG. 2. The field angle of 9.5 degrees is measured at 10% of the maximum intensity.

The lens may for example be formed of PMMA or PC, but any dielectric, including glass, silicone, polyurethane, polyolefines may be used.

An absorbing baffle may be formed of any plastic, either painted black or inherently absorbing, as well as metals, glasses, ceramics. The baffle may be light scattering instead of light absorbing, for example using a white or grey surface.

For a reflecting baffle, a metal coated plastic or highly reflecting metal may be used, formed either from sheet or bulk material.

The cone baffle which contacts the center lens may be mounted by a snap fit into small mounting features provided at the center lens. All other designs which do not touch the center lens can be mounted with thin radial fins extending and connecting to the LED, LED substrate, lamp housing or collimator.

In the examples above, the center lens is shown with smooth refracting entrance and exit surfaces. A surface texture in the form of microlenses may also be applied to either or both of the two center lens surfaces for additional mixing and beam smoothing.

It can be seen from the examples above that many different implementations are possible. The common feature to most examples is that the flux emitted to the TIR Fresnel section is substantially left unobstructed. The light blocking elements may have no interaction at all with the TIR section, or else they can also extend further radially out, in order to influence light going through the first (i.e. radially innermost) TIR tooth or first set of TIR teeth, as they may also produce some light with an off-axis angle that is too large.

As also shown in the examples above, in some designs, the center lens design can remain unchanged compared to a design without the light blocking element. In other designs, it may be beneficial to adjust the center lens design to the characteristics of the light transmitted after the light blocking element.

In all examples, the total efficiency of the device is reduced by having a light blocking element within the structure. To achieve the desired effect of reducing the beam angle of the center lens to an angle similar to the TIR Fresnel section, about 30 to 70% of the light going through the center lens typically may need to be blocked, for example 40 to 50%. When taking into account that up to 70% of the source light is transmitted by the TIR Fresnel section, the total loss of flux efficiency is then 12 to 15%.

While the total flux is reduced, the on-axis intensity (i.e. in the direction in which collimation is provided) is basically left unchanged. This is achieved by selectively blocking off axis light and letting on axis light pass through, and by maintaining the flashed area of the full center lens. The flashed area is the portion of the exit aperture that, when viewed on axis from a large distance (far field), is lit. The flashed are is directly proportional to the achieved intensity.

The designs are preferably rotationally symmetric about the optical axis.

The Fresnel lens for example has a typical diameter in the range 20 mm to 100 mm although smaller and larger lenses can easily be produced (for example from 5 mm to 500 mm).

When formed using plastic injection, typical lens thickness would be between 1.5 mm and 10 mm, although thicker and thinner lenses can also be made. The distance to the source is for many TIR lenses in the range of 15 to 30% of the lens diameter.

The invention is of interest for general spot lamps (such as MR16, GU10, AR111), retail lighting, parabolic aluminized reflector (PAR) lamps, and professional spot lights. It is of interest when reduced halos and less glare are desirable.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A collimator, having a focal point, for positioning over a light source to be provided at the focal point in a light source position, the collimator comprising:
    a Fresnel lens comprising a refractive inner lens portion and an outer toothed total internal reflection portion, the Fresnel lens having an optical axis which passes through the center of the inner lens portion and through the light source position;
    a light blocking element between at least the inner lens portion of the Fresnel lens and the light source position, wherein the light blocking element is adapted such that the inner lens portion has at least one reduced image region, said reduced image region being an area of the inner lens portion where only a portion of the whole shape of the light source can be projected onto when the light source is positioned in the light source position; and
    wherein the light blocking element comprises a set of radially extending fins disposed in an annular arrangement.

2. A collimator as claimed in claim 1, wherein the reduced-image region comprises at least a portion of the inner lens portion at the optical axis.

3. A collimator as claimed in claim 2, wherein the light blocking element comprises a conical baffle.

4. A collimator as claimed in claim 3, wherein the conical baffle has a first opening adjacent the light source position, and a second, larger, opening adjacent the inner lens portion, wherein the second opening is smaller than the inner lens portion.

5. A collimator as claimed in claim 2, wherein the light blocking element comprises a light blocking baffle centered on the optical axis.

6. A collimator as claimed in claim 5, wherein the light blocking baffle is adapted to extend within an area defined by paths between an edge of the light source region, corresponding to the size of the light source for positioning at the light source position, and a point on the opposite side of the inner lens portion.

7. A collimator as claimed in claim 5, wherein the light blocking baffle comprises a reflector to reflect light back to the light source location.

8. A collimator as claimed in claim 1, wherein the reduced-image region comprises at least an outer periphery of the inner lens portion.

9. A collimator as claimed in claim 3, wherein the conical baffle has a first opening adjacent the light source position, and a second, larger, opening adjacent the inner lens portion, wherein the second opening corresponds in size to the inner lens portion.

10. A collimator as claimed in claim 1, wherein the reduced-image region comprises the entire inner lens portion.

11. A collimator as claimed in claim 10, wherein the light blocking element comprises a set of concentric conical baffles arranged against the entire surface of the inner lens portion.

12. A lighting unit comprising:
    a collimator arrangement as claimed in claim 1; and
    a light source positioned at the light source position.

13. A lighting unit as claimed in claim 12, wherein the light source is adapted to provide a light output from a light source region centered on the optical axis.

* * * * *